May 21, 1946.　　K. B. GEERTSEMA　　2,400,548
DRIVER FOR HELICAL MEMBERS
Filed March 16, 1945
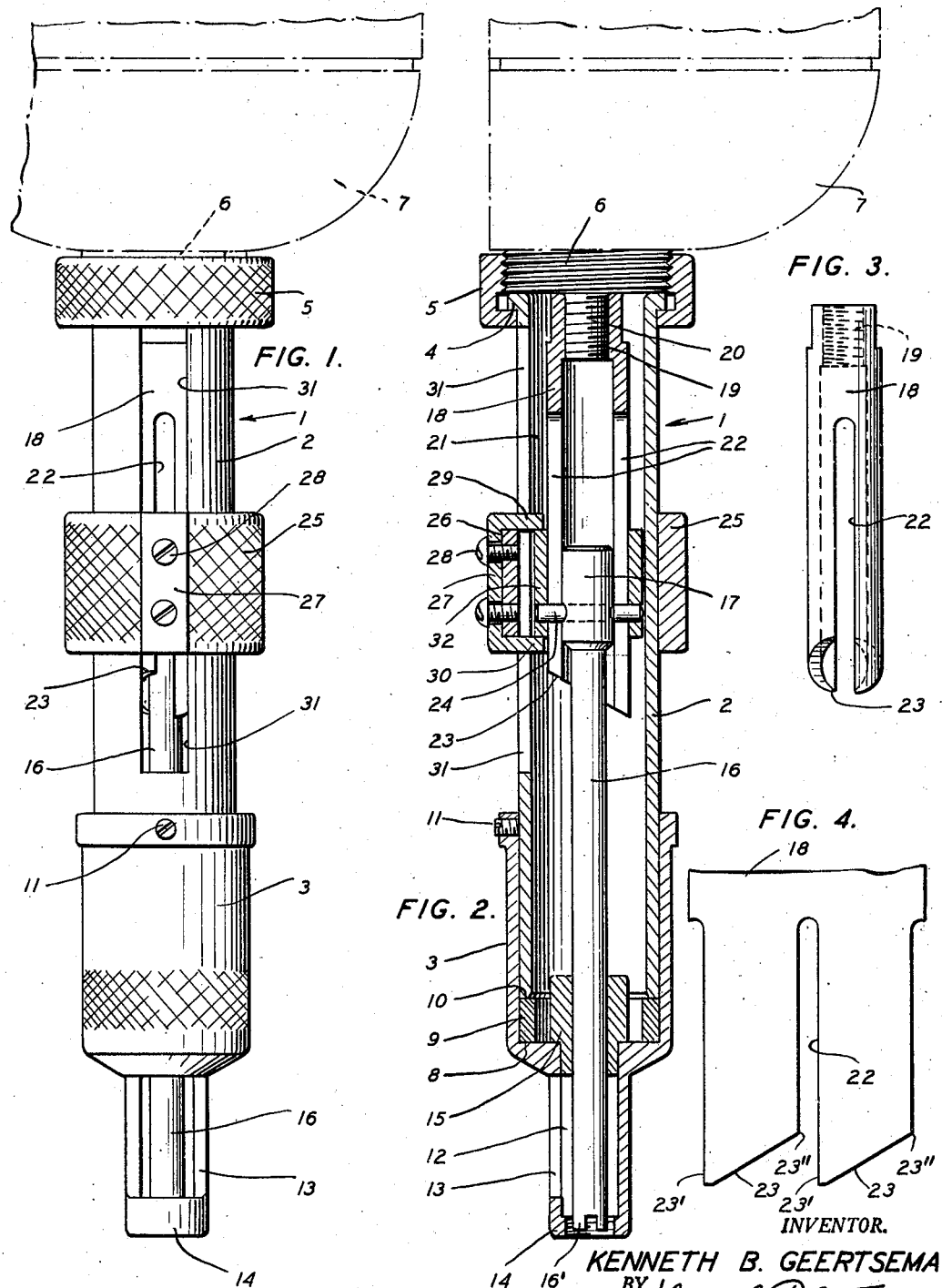
INVENTOR.
KENNETH B. GEERTSEMA
BY Walter S. Bleston
ATTORNEY.

Patented May 21, 1946

2,400,548

UNITED STATES PATENT OFFICE 2,400,548

DRIVER FOR HELICAL MEMBERS

Kenneth B. Geertsema, Valley Stream, N. Y., assignor to Aircraft Screw Products Company, Inc., Long Island City, N. Y., a corporation of New York Application March 16, 1945, Serial No. 583,069

5 Claims. (Cl. 10—1)

The present invention relates to a tool for driving a threaded element such as a screw or wire coil insert into a boss or nut member. More in particular the invention relates to a tool of the type described in U. S. Patent No. 2,371,622 of March 20, 1945, wherein a non-rotatable sleeve, a drive shaft and a driver, such as a screw or insert driver are coaxially arranged, and a connection between the shaft and driver exists which becomes disengaged upon an axial shift of the driver beyond a predetermined position in relation to the shaft.

In a tool of the conventional type, it has been found a disadvantage that the driver cannot readily be shifted by hand either in or out of engagement with the shaft when the sleeve for certain purposes of the tool encompasses more or less the total length of the driver. The present invention aims to eliminate such disadvantage and consists in means operative from the outside of the sleeve and engaging the driver in order to shift the latter in an axial or longitudinal direction without interfering with its freedom to rotate within the sleeve.

Further objects and details of the invention will be apparent from the description given hereinafter and the accompanying drawing showing an embodiment by way of example.

In the drawing:

Figs. 1 and 2 are a side elevation and a longitudinal cross-section respectively of a tool according to the invention;

Fig. 3 is a side view of a part of the tool; and

Fig. 4 is a development of the outer surface of a portion of that part.

Referring now to the drawing, the illustrated tool comprises an outer shell in general denoted by 1 and essentially consisting of an upper part 2 and a lower part 3 in telescopic relationship to each other. The upper shell part 2 has a top flange 4 engaged by a nut 5 to attach the tool to a threading 6 of a prime mover 7 indicated in dash and dot lines. The lower shell part 3 has an inner shoulder 8 and encloses an exchangeable distance piece 9 between shoulder 8 and the lower end rim 10 of the upper shell 2. By selecting a ring 9 of suitable height the tool may be adjusted to a predetermined desired length and the shell parts 2 and 3 may be held in such adjusted position by means of a set screw indicated at 11. The lower portion of shell part 3 forms a shoe 12 laterally recessed at 13 to receive therein a screw-like member (not shown) to be driven by the tool and the lowermost part of the foot 12 may be provided with a threading 14 as a prewinder in the event the tool is to be used for inserting for instance a wire coil lining in an interiorly threaded boss or the like. A bushing 15 is inserted so as to bear on the aforementioned shoulder 8 and to constitute a bearing for a driving rod 16 coaxially arranged within the shell 1 and the lower end 16' of which is formed so as to grip a screw member or the like to be driven by the tool. The driver rod 16 has an enlarged head 17 so shaped as to be capable of sliding within a hollow shaft 18 which may be provided with an inner threading 19 for the connection to the threaded end 20 of the prime mover driving shaft. The outer diameter of the hollow shaft 18 is smaller than the inner diameter of the shell part 2 so that a free space 21 exists between the two members for a purpose to be explained hereinafter. Hollow shaft 18 is provided with longitudinal slots 22 extending through the free end of the shaft. The latter has end faces 23 inclined or helically curved as will be apparent from the development of Fig. 4 and the inclination or pitch is so selected that the edge 23' which leads when shaft 18 is driven projects in relation to the trailing edge 23". A spline-like member such as for instance a pin 24 is secured to the driver head 17 so as to project therefrom through the slots 22 and beyond the outer circumference of the shaft 18. Thus if the shaft 18 is rotated the driver 16 will be taken along when pin 24 is in engagement with the slots 22. As soon, however, as during a driving operation of the tool driver 16 will have shifted axially in relation to shaft 18 so far that the pin 24 has cleared the edge 23' of the shaft end, the driver 16 will come to a standstill while shaft 18 may continue to rotate.

Now it will be clear that in order to charge a screw member to be driven, into the shell shoe 12 through the lateral recess 13 of the latter it is necessary to shift the driver upward from the position of the drawing. For this purpose a ring 25 is slidably mounted on the shell part 2. This ring 25 is recessed at 26 and a U-shaped member 27 is fitted into the ring recess so that it complements the shape of the ring as to its circular circumference and its height. The member 27 is secured to the ring by means such as screws 28 and projects with its two flange portions 29 and 30 into the space 21 through a longitudinal slot 31 provided in the wall of the shell part 2. In consequence ring 25 is longitudinally shiftable with respect to shell portion 2 but prevented from rotation owing to the guiding effect of the walls of slot 31 in engagement with the projections 29 and 30. Another ring 32 is arranged between the projections 29 and 30 and is of such inner and outer diameters that it is movable within the space 21, and the aforementioned driver pin 24 is secured in that ring as shown in Fig. 2. Now it will be clear that the ring 32 can freely rotate within the space 21 and that the projections 29 and 30 constitute bearing means for the ring 32 so that the driver 16 and ring 25 are connected for common movement in axial or longitudinal direction while simultaneously permitting driver 16 to rotate in relation to the shell 1. Hence by shifting ring 25 up or downwards it is possible to raise or lower driver 16 regardless whether it is stationary or rotating relatively to the shell. Furthermore, the inclined surfaces 23 of the end of shaft 18 facilitate the entrance of the pin 24 into the slots 22 when the driver is to be lifted from a disengaged position into a position in which it engages the shaft 18 to be rotated by the latter.

Although I have described only one embodiment of the invention it will be clear to those skilled in the art that many alterations and modifications of the structure as shown and described may be made without departing from the spirit and essence of the invention which shall not be limited but by the scope of the appended claims.

I claim:

1. In a tool of the type described and including a non-rotatable shell and a driver rotatable and axially movable in said shell the combination of guide faces formed by a longitudinal slot in the wall of said shell, a slide member engaging said slot to be guided by said faces and projecting inwardly and outwardly of said shell, a radial projection of said driver, and means embodied by the inwardly projecting slide portion and in engagement with said driver projection to connect said driver and said slide for common movement in axial direction while permitting rotation of the driver relatively to the slide.

2. In a tool of the type described and including in coaxial arrangement a non-rotatable shell, a rotatable shaft interiorly of said shell, a driver in telescopic relationship to said shaft and a disengageable spline connection of said shaft and driver, the combination of first guiding faces formed by a longitudinal slot in the wall of said shell, a slide member on said shell, said slide engaging said slot to be guided by said faces and projecting inwardly of said shell, second guide faces formed by a longitudinal slot of said shaft, a radial projection of said driver adapted to engage said slot of said shaft, thereby constituting said disengageable connection, and means embodied by the inwardly projecting portion of said slide and in engagement with said driver connection outside said shaft to connect said driver and said slide for common movement in axial direction while permitting rotation of the driver relatively to said slide.

3. In a tool of the type described and including a non-rotatable shell and a driver rotatable and axially movable in said shell the combination of guide faces formed by a longitudinal slot in the wall of said shell, a slide member engaging said slot to be guided by said faces and having two substantially parallel inwardly directed projections, a ring between said driver, said shell and said projections of said slide so as to be longitudinally movable with the slide and rotatable within said shell, and means to connect said ring and said driver.

4. In a tool of the type described and including in coaxial arrangement a non-rotatable shell, a rotatable shaft interiorly of said shell, a driver in telescopic relationship to said shaft and a disengageable spline connection of said shaft and driver, the combination of first guiding faces formed by a longitudinal slot in the wall of said shell, a slide member on said shell, said slide engaging said slot to be guided by said faces and having two substantially parallel inwardly directed projections, a rotatable ring longitudinally movable between said shell and said shaft and engaging between said slide projections, second guide faces formed by a longitudinal slot of said shaft, a spline-like radial projection of said driver adapted to engage said slot of said shaft thereby constituting said disengageable connection, said spline-like projection being connected to said ring.

5. In a tool of the type described, a longitudinally slotted non-rotatable shell, a longitudinally slotted rotatable shaft interiorly of said shell, and including an inclined free end face, an axially movable driver in telescopic relationship to said shaft, a slide on said shell in engagement with the slot of the latter, a radial projection of said driver adapted to engage the slot of said shaft and to be guided by said inclined end face into engagement, and means to connect said driver projection to said slide for common longitudinal movement while permitting rotation of the driver relatively to said slide.

KENNETH B. GEERTSEMA.